US011682093B2

(12) United States Patent
Awoyemi et al.

(10) Patent No.: US 11,682,093 B2
(45) Date of Patent: *Jun. 20, 2023

(54) DOCUMENT TERM RECOGNITION AND ANALYTICS

(71) Applicant: Capital One Services, LLC, McLean, VA (US)

(72) Inventors: Olalekan Awoyemi, Prosper, TX (US); Jason Hoover, Grapevine, TX (US); Staevan Duckworth, The Colony, TX (US); Geoffrey Dagley, McKinney, TX (US); Stephen Wylie, Carrollton, TX (US); Qiaochu Tang, The Colony, TX (US); Micah Price, Anna, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,856

(22) Filed: Oct. 22, 2021

(65) Prior Publication Data

US 2022/0044289 A1 Feb. 10, 2022

Related U.S. Application Data

(63) Continuation of application No. 16/244,844, filed on Jan. 10, 2019, now Pat. No. 11,157,972.

(51) Int. Cl.
*G06F 16/31* (2019.01)
*G06Q 50/18* (2012.01)
(Continued)

(52) U.S. Cl.
CPC ......... *G06Q 50/188* (2013.01); *G06F 16/313* (2019.01); *G06N 20/00* (2019.01); *G06V 30/413* (2022.01); *G06Q 30/0282* (2013.01)

(58) Field of Classification Search
CPC ............ G06Q 50/188; G06Q 30/0282
See application file for complete search history.

(56) References Cited

U.S. PATENT DOCUMENTS 6,067,531 A 5/2000 Hoyt et al.
9,874,859 B1 1/2018 Perzichilli
(Continued)

OTHER PUBLICATIONS

* S. Joshi, P. Shah and A. K. Pandey, "Location Identification, Extraction and Disambiguation using Machine Learning in Legal Contracts," 2018 4th International Conference on Computing Communication and Automation (ICCCA), 2018, pp. 1-5, doi: 10.1109/CCAA.2018.8777631 (Year: 2018).*
(Continued)

*Primary Examiner* — Gabrielle A McCormick
*Assistant Examiner* — Maame Ofori-Awuah
(74) *Attorney, Agent, or Firm* — Harrity & Harrity, LLP

(57) ABSTRACT

A device receives image data of a contractual document that includes an offer including terms of a proposed transaction, converts the image data to text data that identifies text within the contractual document, and receives preferences information for a recipient of the offer. The device identifies key terms within the contractual document by using term identification to analyze the text. The key terms may include a first key term that identifies subject matter of the proposed transaction and other key terms that are part of the offer. The device determines term scores that correspond to likelihoods of the other key terms being favorable to the recipient by using a data model to analyze the key terms and the preferences information. The device, based on the term scores, generates and provides another device with a recommendation to be used in determining whether the accept the offer.

20 Claims, 9 Drawing Sheets

(51) Int. Cl.
*G06N 20/00* (2019.01)
*G06V 30/413* (2022.01)
*G06Q 30/0282* (2023.01)

(56) References Cited

U.S. PATENT DOCUMENTS

| | | | |
|---|---|---|---|
| 11,157,972 B2 | 10/2021 | Awoyemi et al. | |
| 2003/0115080 A1* | 6/2003 | Kasravi | G06Q 10/06312 715/254 |
| 2006/0106653 A1 | 5/2006 | Lis | |
| 2014/0019368 A1* | 1/2014 | Noh | G06Q 30/06 705/80 |
| 2014/0180826 A1* | 6/2014 | Boal | G06Q 30/0207 705/14.66 |
| 2016/0314529 A1* | 10/2016 | Dolle | G06Q 40/025 |
| 2017/0061352 A1 | 3/2017 | Kogut-O'Connell et al. | |
| 2017/0364374 A1 | 12/2017 | Maiden | |
| 2018/0268506 A1* | 9/2018 | Wodetzki | G06N 5/046 |
| 2020/0026916 A1 | 1/2020 | Wood et al. | |

OTHER PUBLICATIONS

Chakrabarti, et al., "Use of Artificial Intelligence to Analyse Risk in Legal Documents for a Better Decision Support," TENCON 2018-2018 IEEE Region 10 Conference, Jeju, Korea, Oct. 28-31, 2018, pp. 0683-0688, DOI: 10.1109/TENCON.2018.8650382.

Kepes, B., "eBrevia Applies Machine Learning to Contract Review," Feb. 20, 2015, 4 pages, https://www.forbes.com.sites/benkepes/2015/02/20/ebrevia-applies-machine-learning-to-contract-review/#1fd4eb5756da.

LegalSifter | Sift before you sign your Contracts, Jan. 9, 2019, 3 pages, https://www.legalsifter.com/.

Reduce Contract Review Pain Points with Machine Learning, Feb. 25, 2016, 48 pages, https://www.iltanet.org/HigherLogic/System/DownloadDocumentFile.ashx?DocumentFileKey=67ca7881-2974-5.

Waisbert, N., "Machine Learning Based Contract Provision Extraction on Poor Quality Scans Contract Review Software Buyers Guide," Mar. 19, 2014, 12 pages, https://info.kirasystems.com/blog/2014/03/19/machine-learning-based-contract-provision-extraction-on-poor-quality-scans-contract-review-software-buyers-guide-ix.

* cited by examiner

| Example Inputs | Example Data Models | Example Outputs |
|---|---|---|
| • Document (Including All Terms)<br>• Key Terms<br>• User Profile Information<br>• Offer Information of Similar Offers | • Classification-Based Machine Learning<br>• Regression-Based Machine Learning<br>• Neural Network | • Term Scores Indicating Likelihoods of Key Terms Being Favorable to Recipient of Offer<br>• Overall Score Indicating Overall Likelihood of Offer Being Favorable to Recipient of Offer |

135
Determine term scores that correspond to likelihoods of key terms being favorable to user Document Management Platform

140
Determine overall score that corresponds to likelihood of document being favorable to user Document Management Platform

FIG. 1C

DOCUMENT TERM RECOGNITION AND ANALYTICS

RELATED APPLICATION

This application is a continuation of U.S. patent application Ser. No. 16/244,844, filed Jan. 10, 2019 (now U.S. Pat. No. 11,157,972), which is incorporated herein by reference in its entirety.

BACKGROUND

A contractual document may include a set of terms that are to be considered material to an offer for a product, a service, and/or the like. In some cases, a purchaser may be handed a hard copy of the contractual document and may be expected to read, understand, and sign the contractual document as part of an acceptance of the offer.

SUMMARY

According to some implementations, a method may include receiving image data of a contractual document that includes an offer, wherein the offer includes terms of a proposed transaction, and converting the image data to text data that identifies text within the contractual document. The method may include identifying a set of key terms within the contractual document by using one or more term identification techniques to analyze the text, wherein the set of key terms includes a first key term that identifies subject matter of the proposed transaction, and one or more key terms that are part of the offer. The method may include determining a set of term scores that correspond to one or more likelihoods of the one or more key terms being favorable to a recipient of the offer, wherein determining the set of term scores includes analyzing the set of key terms using a data model that has been trained using one or more machine learning techniques. The method may include generating, based on the set of term scores, a recommendation for the recipient of the offer, wherein the recommendation includes at least one of: an indication of whether to accept the offer, or one or more recommended modifications to one or more of the one or more key terms. The method may include providing the recommendation for display via an interface that is accessible to the recipient of the offer, to permit the recommendation to be used by the recipient in determining whether to accept the offer.

According to some implementations, a device may include one or more memories, and one or more processors, operatively coupled to the one or more memories, configured to receive image data of a contractual document that includes an offer, wherein the offer includes terms of a proposed transaction. The one or more processors may receive preferences information for a recipient of the offer and may convert the image data to text data that identifies text within the contractual document. The one or more processors may identify a set of key terms within the contractual document by using one or more term identification techniques to analyze the text, wherein the set of key terms includes a first key term that identifies subject matter of the proposed transaction, and one or more key terms that are part of the offer. The one or more processors may determine a set of term scores that corresponds to one or more likelihoods of the one or more key terms being favorable to the recipient of the offer by using a data model that has been trained using one or more machine learning techniques to analyze the set of key terms, and the preferences information for the recipient of the offer. The one or more processors may generate, based on the set of term scores, a recommendation for the recipient of the offer, wherein the recommendation includes at least one of: an indication of whether to accept the offer, or one or more recommended modifications to the one or more key terms. The one or more processors may provide the recommendation for display via an interface that is accessible to the recipient of the offer, to permit the recommendation to be used in determining whether to accept the offer.

According to some implementations, a non-transitory computer-readable medium may store instructions that include one or more instructions that, when executed by one or more processors of a device, cause the one or more processors to receive, from another device, image data of a contractual document that includes an offer, wherein the offer includes terms of a proposed transaction. The one or more instructions may cause the one or more processors to convert the image data to text data that identifies text within the contractual document. The one or more instructions may cause the one or more processors to identify a set of key terms within the contractual document by using one or more term identification techniques to analyze the text, wherein the set of key terms include a first key term that identifies the subject matter of the proposed transaction, and one or more key terms that are part of the offer. The one or more instructions may cause the one or more processors to determine a set of term scores that corresponds to one or more likelihoods of the one or more key terms being favorable to a recipient of the offer by using a data model that has been trained using one or more machine learning techniques to analyze at least one of: the set of key terms, or preferences information for the recipient of the offer. The one or more instructions may cause the one or more processors to determine an overall score that indicates an overall likelihood of the one or more key terms being favorable to the recipient of the offer by analyzing the set of term scores. The one or more instructions may cause the one or more processors to generate, based on the overall score, a recommendation for the recipient of the offer, wherein the recommendation includes at least one of: an indication of whether to accept the offer, or one or more recommended modifications to the one or more key terms. The one or more instructions may cause the one or more processors to provide the recommendation for display via an interface of the other device to permit the recommendation to be used in determining whether to accept the offer.

BRIEF DESCRIPTION OF THE DRAWINGS

FIGS. 1A-1D are diagrams of one or more example implementations described herein.

DETAILED DESCRIPTION

Figure 1A:
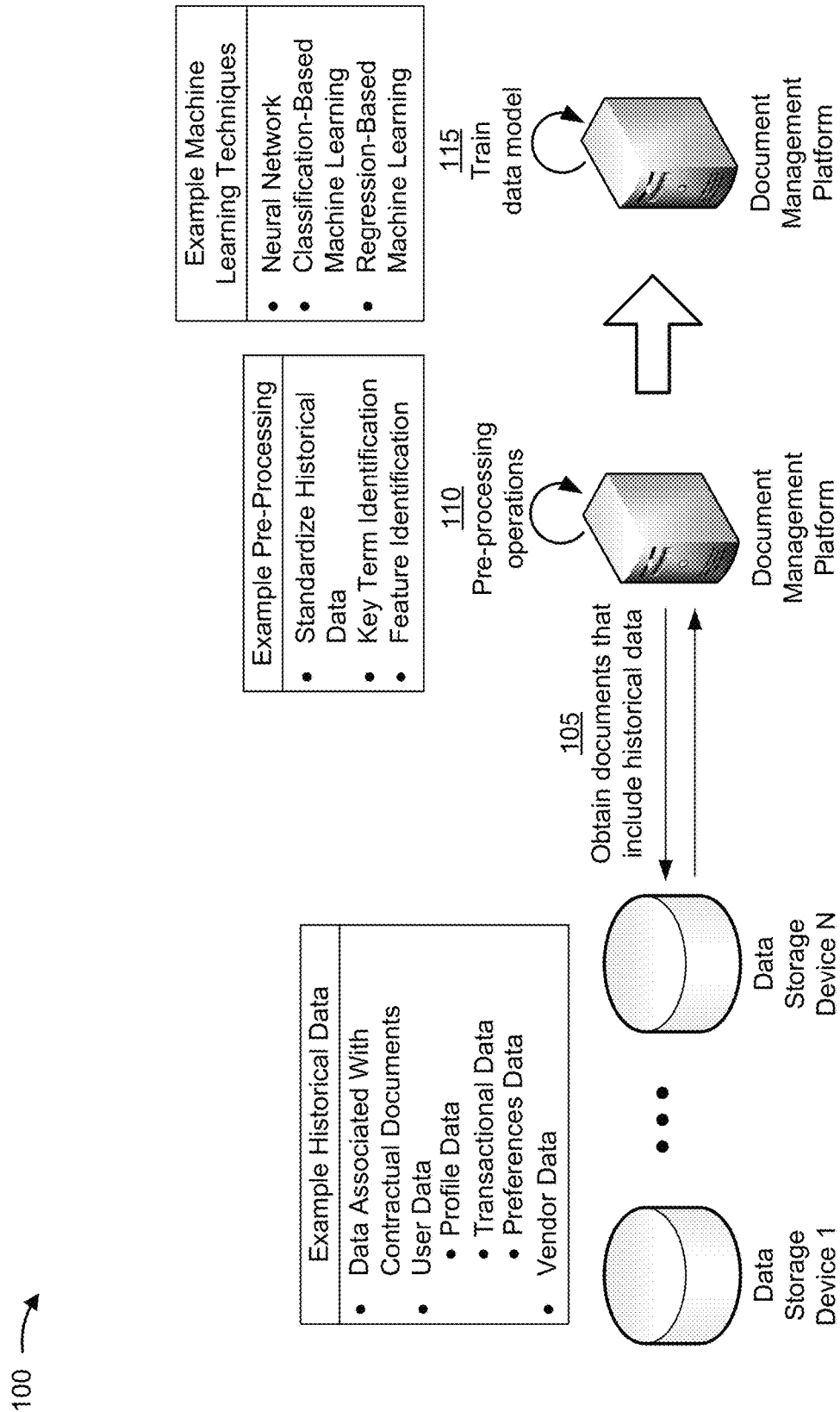

The following detailed description of example implementations refers to the accompanying drawings. The same reference numbers in different drawings may identify the same or similar elements.

To purchase a product and/or a service, a consumer may visit a store (e.g., an in-person store, an e-store, etc.), may engage in a shopping experience provided by the store, and may interact with a sales representative (e.g., an employee, a virtual agent, etc.) to engage in a transaction to purchase the product and/or the service. To complete a transaction to purchase the product and/or the service, the consumer may have to sign a contractual document that includes a set of terms that are material to the transaction. When the consumer visits the in-person store, the consumer may be handed a hard copy of the contractual document and may be expected to read, understand, and sign the contractual document as part of an acceptance of the offer.

However, the consumer may not fully understand the contractual document and may be expected to sign the contractual document on the spot (e.g., without a sufficient amount of time to thoroughly read through the contractual document). In some cases, to better understand the contractual document, the consumer may waste resources (e.g., processing resources, network resources, and/or the like) of a device (e.g., a smart phone, a desktop computer, etc.) by using the device to manually research the terms of the contractual document. Furthermore, if the consumer completes the transaction without fully understanding the terms, the consumer may waste resources of the device by interacting with the device to cancel the transaction (e.g., by using the device to perform a cancellation procedure, by using the device to research how to cancel the transaction, etc.), by interacting with the device to leave a negative review of the experience (e.g., which would not be necessary had the consumer understood the terms well enough to obtain more favorable terms), and/or the like.

Some implementations described herein provide a document management platform to identify and analyze a set of key terms that are part of an offer included in a contractual document and to generate and provide a user device with a recommendation that will assist an individual (referred to herein as a user) in determining whether to accept the offer. For example, the user may interact with a user device, such as a smartphone, to capture a set of images of the contractual document. The user device may provide image data, associated with the set of images of the contractual document, to the document management platform. In this case, the document management platform may use one or more term identification techniques (defined further herein) to identify the set of key terms within the contractual document.

Additionally, the document management platform may use machine learning to analyze the set of key terms to determine a set of scores that correspond to likelihoods of particular key terms being favorable to the user. Furthermore, the document management platform may generate a recommendation for the user, which may include a message indicating whether to accept the offer, one or more recommended modifications to make to one or more of the set of key terms included in the offer, and/or the like. Additionally, the document management platform may provide the recommendation to the user device to cause the user device to display the recommendation in a manner accessible to the user.

In this way, the document management platform provides the user with a recommendation that can be viewed by the user when determining whether to accept the offer. Additionally, by recommending modifications to one or more key terms (e.g., a modification to a key term that is not favorable to the user), the document management platform improves a likelihood that the offer, if accepted by the user, will be a favorable offer. This conserves resources (e.g., processing resources, network resources, memory resources, and/or the like) that would otherwise be used by the user to manually research particular key terms or aspects of the offer, resources that would otherwise be used to accept the offer with one or more key terms that are not favorable to the user, resources that would otherwise be used to research and/or carry out a cancellation procedure after accepting the offer with the one or more key terms that are not favorable to the user, and/or the like.

Furthermore, several different stages of the process described herein are automated, which may remove human subjectivity and waste from the process, and which may improve speed and efficiency of the process and conserve computing resources (e.g., processor resources, memory resources, and/or the like). For example, the document management platform may, without human intervention, automatically analyze the contractual document and provide the user with the recommendation. As stated above, this eliminates a need for the user to manually research key terms or aspects of the offer, thereby conserving resources of the user device, reducing or eliminating chances of human error during the manual review, and improving quality and efficiency of the process. Additionally, implementations described herein use a rigorous, computerized process to perform tasks or roles that were not previously performed or were previously performed using subjective human intuition or input.

FIGS. 1A-1D are diagrams of one or more example implementations 100 described herein. Example implementation(s) 100 may include a group of data storage devices (shown as Data Storage Device 1, . . . , Data Storage Device N), a document management platform, a user device, a device associated with a relationship manager of a financial institution, and a vendor device. FIGS. 1A-1D describe the document management platform training a data model using machine learning and using the data model to make a recommendation that a user may utilize when determining whether to accept an offer of a sale for a product and/or a service. While the description herein will focus on an offer of a sale for a product and/or a service, the description equally applies to an offer of a lease and/or an offer of a sale of any asset, such as a product, a home, land, a business, office space, and/or the like.

As shown in FIG. 1A, and by reference number 105, the document management platform may obtain documents that include historical data. For example, the document management platform may obtain, from one or more of the set of data storage devices, documents that include historical data that is to be used to train the data model.

In some implementations, the set of data storage devices may store a corpus of documents for one or more organizations. For example, the set of data storage devices may store the corpus of documents using one or more data structures, such as a database (e.g., a relational database, a flag database, and/or the like), an array, a linked-list, a tree, a graph, a hash table, and/or the like. In some cases, the set of data storage devices may store large quantities of data (e.g., gigabytes, terabytes, or more). For example, the corpus of documents may include tens of thousands of documents, hundreds of thousands of contractual documents, or more.

In some implementations, the documents may include a set of contractual documents, a set of documents identifying favorable deal structures for particular users (e.g., as created by human experts), a set of documents identifying user profiles, a set of documents identifying vendor profiles, and/or the like. The historical data that is included in the documents may include data associated with the set of contractual documents, user data for registered users, vendor data for one or more vendors, and/or the like.

The data associated with the set of contractual documents may include data identifying one or more terms within a contractual document (e.g., a key term, another term, etc.), data identifying whether a contractual document was accepted by a user, data identifying a date at which a contractual document was accepted, and/or the like. A key term, as used herein, may refer to a term that is material to an offer made within a contractual document, a name of a seller, a product or service identifier, a price of a product or a service, a problematic key term or phrase (e.g., a penalty clause, such as a liquidated damages clause), and/or the like. The user data may include user profile data identifying a user (e.g., a name, contact information, an address, etc.), transactional data identifying past transactions made by the user (e.g., data identifying past contractual documents that the user has accepted, rejected, etc.), preferences data identifying one or more user preferences (e.g., purchasing preferences, product or service preferences, brand preferences, etc.), financial data of the user (e.g., credit information, bank information, etc.), and/or the like. The vendor data may include data identifying a vendor, data identifying one or more products or services offered by a vendor, price data identifying one or more prices offered by a vendor for a product or a service, and/or the like.

As an example, the contractual documents may include sales contracts, such as contracts directed to sale of vehicles. In this example, the historical data may include data associated with a set of vehicle purchasing agreements, user data for users that were purchasers or offerees for offers made in the set of vehicle purchasing agreements, vendor data for a set of car dealerships, and/or the like. The data associated with the set of vehicle purchasing agreements may include data identifying key terms within a vehicle purchasing agreement, data identifying whether an offer for a sale of a vehicle was accepted, and/or the like. The key terms may include a second key term identifying a seller, a third key term identifying a date on which the offer was made, a fourth key term identifying a date that the offer was accepted, a set of key terms relating to vehicle information for a vehicle (e.g., a year, a make, a model, a current mileage, and/or the like), a set of key terms relating to purchasing information (e.g., a sales price, a down payment amount, an annual percentage rate (ARP) associated with a loan for the vehicle, a term of years for the loan, and/or the like), and/or the like.

As shown by reference number 110, the document management platform may perform one or more pre-processing operations. For example, the document management platform may standardize the historical data, identify key terms within the historical data (e.g., key terms within a contractual document, key terms within a user profile document, and/or the like), identify one or more features to use when training the data model, and/or the like, as each described below.

In some implementations, the document management platform may convert the historical data to a uniform format. For example, the documents may include text files, image files, multimedia files, and/or the like. In this case, the document management platform may convert data included in the files (e.g., text data, image data, multimedia data) to a uniform format (e.g., by converting the image data and the video data to text data). As an example, the document management platform may use a data conversion technique, such as an optical character recognition (OCR) technique or a similar type of technique to convert image data to text data that may be used for further processing.

In some implementations, the document management platform may identify key terms within the historical data. For example, the document management platform may identify key terms by analyzing the historical data included in the documents using one or more term identification techniques, such as a term matching technique, one or more natural language processing techniques, a machine learning technique, and/or the like, as each described below. This may allow the document management platform to use the identified key terms when identifying features that may be used when training the data model.

In some implementations, the document management platform may identify a set of key terms within a document using the term matching technique. For example, the document management platform may have access to a data structure that stores a master set of key terms that are found in particular contractual documents. In this case, the document management platform may use the term matching technique to compare text included within the document and the master set of key terms. If text is found that matches or satisfies a threshold level of similarity with one of the master set of key terms, the text may be identified as a key term.

Additionally, or alternatively, the document management platform may identify a set of key terms within a document using the one or more natural language processing techniques. The one or more natural language processing techniques may include a fuzzy matching technique, a tokenization technique, a lexical analysis technique, an occurrence counting technique (e.g., term frequency and inverse document frequency (TF-IDF) technique), a technique to reduce or eliminate stop words (e.g., a word that occurs frequently in text and may waste processing resources to analyze), a lemmatization and/or stemming technique (e.g., to reduce an inflected word to a word stem to conserve processing resources), a technique using regular expressions, and/or the like.

As an example, the document management platform may use a fuzzy matching technique to identify one or more key terms. In this example, the document management platform may use a fuzzy matching technique (e.g., a word distance technique, an N-gram technique, and/or the like) to identify one or more key terms that satisfy a threshold level of similarity with one or more of the master set of key terms stored via the data structure. In this way, the document management platform may identify particular key terms within a document, even if the particular key terms are modified variations of corresponding key terms included in the master set of key terms.

Additionally, or alternatively, and provided as another example, the document management platform may identify one or more key terms using an occurrence counting technique. In this example, the document management platform may determine a frequency at which particular terms are found in contractual documents. If one or more terms occur a threshold number of times in a document or a threshold number of times throughout a set of documents, the document management platform may identify the term as key terms. In this way, the document management platform is able to identify terms as key terms, even without a configuration that identifies a master set of key terms (e.g., such as is needed when using the term matching technique).

In some implementations, the document management platform may convert text data to a set of vectors that may be used to identify key terms. For example, the document management platform may utilize a machine learning technique (e.g., a neural network, such as a convolutional neural network (CNN), a Word2Vec technique, and/or the like) and, to utilize the machine learning technique, the text data included in a document or corpus of documents may be converted to a set of vectors. A vector, as used herein, may refer to a matrix of values that represent a degree of similarity to a term (e.g., relative to other terms in a document or corpus of documents). The matrix may include values that indicate a degree of similarity between characters of terms, a degree of similarity between words that is based on a position of the words in a document or corpus of documents, a degree of similarity that is based on neighboring words within the document or corpus of documents, and/or the like. To compute a vector for a term, the document management platform may use context to predict the term (e.g., using a continuous bag of words technique or a similar type of technique) or may use another term, such as a neighboring term, to predict context of the term (e.g., using a skip-gram technique or a similar type of technique). When the values of the vector cannot be used to accurately predict the term, the term's context, and/or the like, the values of the vector may be modified. This process may be repeated until values included in the set of vectors satisfy a threshold level of accuracy (e.g., a level where the vector is able to effectively predict terms or context of terms).

In some implementations, the document management platform may identify a set of features to use when training the data model. For example, the document management platform may identify a set of features by analyzing the documents and/or the identified key terms using a feature identification technique, such as text mining and latent semantic analysis (LSA), a trend variable analysis, an interest diversity analysis, a neural network, a composite indicators analysis, a clustering analysis, and/or the like.

The set of features may serve as indicators of a particular key term being favorable or unfavorable to a user, to a group of users, and/or the like. The set of features may include a feature for a particular key term, a feature for a value corresponding to the particular key term, a feature for a range of values corresponding to the particular key term, a feature for a combination of key terms, a feature for a combination of values or ranges of values corresponding to key terms, a feature for a combination of a particular key term and one or more terms that are not key terms, a feature for a combination that includes multiple key terms and one or more terms that are not key terms, a feature for a vector, a feature for a combination of vectors, and/or the like.

As an example, a set of contractual documents may include a key term indicating a price of a vehicle and each document in the set of contractual documents may include a corresponding value for the key term. In this example, the document management platform may use a feature identification technique to identify that a lower value (e.g., indicating a lower price) is better for a user than a higher value (e.g., indicating a higher price). This may, for example, be because offers included in a first subset of contractual documents, that were rejected by users, include values that correspond to higher prices. Similarly, offers included in a second subset of contractual documents, that were accepted by users, include values that correspond to lower prices.

As another example, the document management platform may use a feature identification technique to identify that a first value that represents a lower interest rate may not be a feature that is favorable to the buyer if combined with one or more other values (e.g., a value representing a large monthly payment, a value representing a long term of years, a value that represents a penalty clause indicating that one missed or late payment causes the first value to increase drastically, and/or the like). This may, for example, be because users were likely to reject similar offers, because the users considered the one or more other values as unfavorable terms that prevented the users from accepting the offer, and/or the like.

As another example, the document management platform may use a feature identification technique to identify one or more values that represent rights that the user is being asked to forfeit (e.g., which the user should not forfeit), such as a value indicating that the user will refrain brining lawsuit, will be unable to return the vehicle for any reason, and/or any other unconscious key terms that are grossly unfavorable to the user and/or may be in violation of contract laws.

As another example, the content of a value may not be the only thing that causes the feature identification technique to select the value as a feature. For example, a term that would be fair to include in a vehicle contract if placed in a clear, easy to understand, location, may not be favorable to the user if the term is displayed in the contractual document in a way that is unclear, not easy to understand, in an incorrect or illogical section within the contractual document, and/or the like.

As another example, the document management platform may use a feature identification technique to identify that one or more values of key terms are more, or less, likely to be features that are favorable to the user, depending on the user information (e.g., user preferences, user financial data, credit data, and/or the like) of the purchaser being provided with the offer. As a specific example, a value identifying a down payment, an APR, a term of years of a loan, and/or the like, may be identified as features for a first group of users but not for a second group of users (e.g., because different users are in different financial situations, have different spending capacities, and/or the like).

These examples are intended to be illustrative. In practice, the document management platform may identify any number of different combinations of key terms, terms that are not key terms, key terms or terms combined with other data (e.g., particular user data, particular vendor data, etc.), and/or the like, as features that may serve as indicators of a particular contractual document or offer being favorable to a user.

As shown by reference number 115, the document management platform may train the data model. For example, the document management platform may train the data model on the historical data, the set of features, and and/or the like, using one or more machine learning techniques. This may allow the data model to be trained to analyze particular inputs (e.g., a contractual document, key terms of the contract document, user data, and/or the like) to generate a set of term scores that correspond to one or more likelihoods of particular key terms being favorable to a user. The one or more machine learning techniques may include a technique using a neural network (e.g., a Word2Vec technique, a convolutional neural network (CNN), and/or the like), a classification-based technique, a regression-based technique, and/or another type of machine learning technique.

As an example, the document management platform may train a data model using a neural network, such as a CNN. In this example, the document management platform may analyze the set of vectors (e.g., as identified above) using a set of convolutional layers of a CNN, a set of pooling layers of the CNN, a fully-connected layer of the CNN, a results layer of the CNN, and/or the like. For example, the document management platform may analyze the set of vectors using a first convolutional layer of the CNN by applying a filter to one or more portions of the set of vectors. The filter may be an array of numbers that represent weighted values. As the filter is applied to the set of vectors, the filter may be used to multiply the one or more weighted values of the filter with the matrix of values that represent the set of vectors. The output of applying the filter to the one or more portions of the set of vectors may be a feature map. The feature map may be a matrix of values that represents, for the set of features used to train the CNN, a likelihood of certain key terms or combinations of key terms being particular features.

Continuing with the example, the document management platform may provide the feature map generated from the first convolutional layer of the CNN as an input to a first pooling layer or to a second convolutional layer of the CNN. If the first convolutional layer identified high-level features (e.g., a lower vehicle price is a feature that is more favorable to a buyer, a higher vehicle price is a feature that is less favorable to the buyer, etc.), the second convolutional layer may be used to generate a feature map with more complex features, such as combinations of features (e.g., a lower vehicle price may not be a feature that is more favorable to the buyer if combined with other values, such as a high monthly payment or a long term of years on a loan). Each additional convolutional layer may be used to identify more complex features.

Continuing with the example, the document management platform may provide an output of a final convolutional layer (e.g., a final feature map) as input to a fully connected layer to output an M-dimensional vector where M is a number of classes that are capable of being selected. As a particular example, the M-dimensional vector may include one or more values indicating a likelihood of a key term being favorable to a user, a likelihood of a combination of features key terms or other terms or data being favorable to a user, a likelihood of a document as a whole being favorable to the user, and/or the like.

In this way, the document management platform trains the data model to be able to receive various inputs (e.g., a contractual document, key terms, user data, and/or the like) and to generate a set of term scores that may be used to determine whether a contractual document includes key terms that are favorable to a user.

Figure 1B:
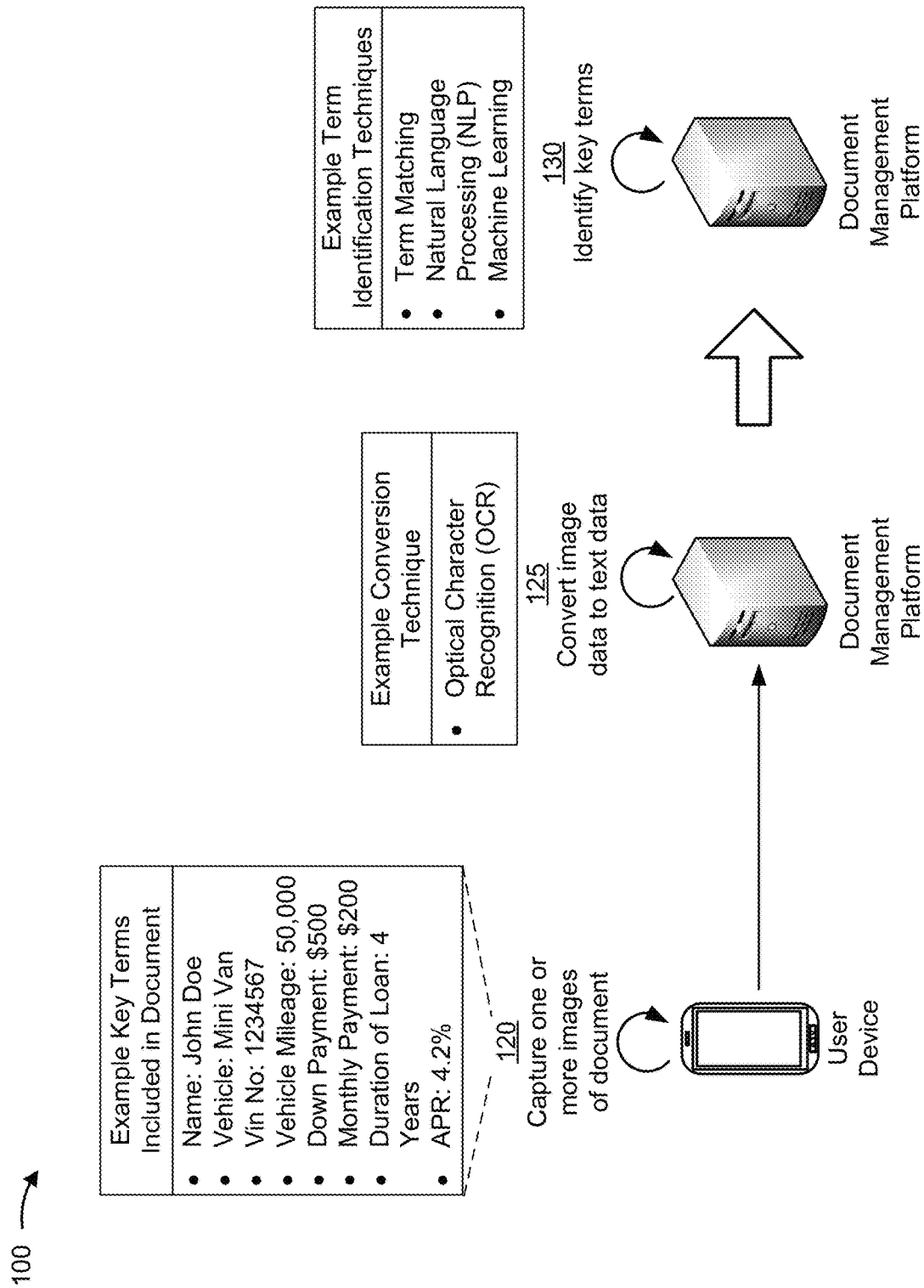

As shown in FIG. 1B, and by reference number 120, the user device may capture one or more images of a contractual document. For example, a user may be engaging with an employee of a vendor organization to purchase a product and/or a service. The employee may provide the user with a contractual document that includes an offer for a sale of the product and/or the service. In this case, the user may interact with a camera feature of the user device to capture one or more images of the contractual document. After the user device captures an image, the user device may provide image data, corresponding to the image, to the document management platform for further processing.

In some implementations, the user may manually take capture individual images of each page of the contractual document (e.g., by capturing an image of a first page, turning the contractual document to a second page, capturing an image of the second page, and/or the like). In some implementations, the user may interact with the user device to record a video that captures each page of the contractual document. In some cases, the user may utilize a camera feature that is built into the user device. In other cases, the camera feature may be part of an application that is described below.

In some implementations, the user device may access an application (e.g., an application hosted on the user device, a web application, and/or the like) to provide the document management platform with image data for the captured images. The application may include a contract recommendation service and may allow a user to capture and/or upload the one or more images of the contractual document and to upload the one or more images to the document management platform (e.g., via an interface of the application). In some implementations, the contractual document may be an electronic document, and the user may use the application to upload the electronic document to the document management platform.

As shown by reference number 125, the document management platform may convert image data to text data. For example, the document management platform may convert image data, corresponding to the one or more images received from the user device, to text data using a data conversion technique, such as an OCR technique or a similar type of technique, as described elsewhere herein.

As shown by reference number 130, the document management platform may identify a set of key terms within the document. For example, the document management platform may identify a set of key terms by analyzing the text data using at least one of the one or more term identification techniques.

As an example, the document management platform may identify a set of key terms by analyzing the text of the document using a tokenization technique. In this example, the document management platform may identify key terms within the document (e.g., by separating text into terms based on a special character search (e.g., searching for a white space character), may compare the terms and a configured set of tokens, and may identify a subset of terms, as the set of key terms, based on the subset of the terms satisfying a threshold level of similarity with the configured set of tokens. Additionally, or alternatively, the document management platform may use one or more of the other term identification techniques described elsewhere herein. Additionally, or alternatively, the document management platform may convert the text to a set of vectors that may be further processed by a neural network, as described elsewhere herein.

In this way, the document management platform identifies a set of key terms that may further processed when generating a recommendation for the user.

As shown in FIG. 1C, and by reference number 135, the document management platform may determine a set of term scores that correspond to one or more likelihoods of the set of key terms being favorable to the user. For example, the document management platform may use the data model to analyze a set of input data to determine a set of term scores that correspond to one or more likelihoods of the set of key terms being favorable to the user. The set of input data may include data identifying the contractual document (e.g., an image of the entire contractual document, text data or converted text data within the contractual document, and/or the like), data identifying the set of key terms, user data of the individual, data identifying offer information of similar offers, and/or the like, as further described by the examples below.

As an example, the document management platform may provide, as input to the data model, the data identifying contractual document and/or the data identifying the set of key terms. This may cause the data model to output the set of term scores that correspond to likelihoods of the set of key terms being favorable to the user. In this example, the set of term scores may be based on what was favorable to past users (e.g., because the data model is not considering user data, data identifying offer information of current offers, and/or the like).

As another example, the document management platform may provide, as input to the data model, the data identifying contractual document, the data identifying the set of key terms, and/or the user data. This may cause the data model to output the set of term scores that correspond to likelihoods of the set of key terms being favorable to this particular user. In this example, the set of term scores may be based on what was favorable to past users, what this particular user has previously indicated is favorable (e.g., based on a user profile that may, for example, include user preferences, results from simulated online negotiations performed by the user, and/or the like), what is predicted to be favorable to this particular user (e.g., based on the data model also analyzing the user data), and/or the like. In one or more of these examples, the document management platform may flag terms or values that are different than those found in contractual documents of past users, contractual documents found in or analyzed by the user (e.g., which may be identified by data associated with the user profile), and/or the like. This may indicate to the user which terms are being considered for the first time, which terms may require a closer inspection, and/or the like.

As another example, the document management platform may provide, as input to the data model, the data identifying the contractual document, the data identifying the set of key terms, the user data, and/or the data identifying the offer information for similar offers. In this example, the document management platform may obtain the data identifying the offer information for similar offers (e.g., offers that are actively being made by other vendors) by searching one or more websites or other data sources for offers that share a threshold number of similar key terms, offers that are for the same or similar product, and/or the like. Additionally, the data model may process the set of input data to output the set of term scores that correspond to likelihoods of the set of key terms being favorable to the user. In this example, the set of term scores may be based on what was favorable to past users, what is predicted to be favorable to the user, and/or whether the key terms are favorable to the user relative to key terms found in the similar offers.

As shown by reference number 140, the document management platform may determine an overall score that corresponds to a likelihood of the contractual document being favorable to the user. For example, the document management platform may determine an overall score based on an analysis of the set of term scores, such as by determining whether the set of term scores satisfies a corresponding set of threshold favorability scores, determining an average of the set of term scores, determining a weighted average of the set of term scores, and/or the like.

Additionally, or alternatively, the document management platform may determine the overall score based on whether the set of term scores satisfies a corresponding set of threshold favorability scores. For example, the document management platform may be configured with a set of threshold favorability scores that are associated with ranges of term scores. In this case, the document management platform may compare the set of term scores to the corresponding set of threshold favorability scores to determine the overall score.

As an example, a price of a vehicle may be a key term and may have a value of $10,000. A term score may, in one example, be a value between one and ten, where one indicates a low degree of favorability to the user and ten indicates a high degree of favorability to the user. In this example, the document management platform may be configured with one or more threshold favorability scores that map to ranges of term scores. As a particular example, a term score between one and three might represent that the key term is not favorable to the user, a term score between four and six might represent that the key term is neutral, slightly favorable, or slightly unfavorable, to the user, and a term score between seven and ten might represent that the key term is favorable to the user. Additionally, the document management platform may compare the term score to the one or more threshold favorability scores and may determine which of the one or more threshold favorability scores are satisfied by the term score. This may be used as a factor in determining the overall score.

In some cases, the document management platform may determine the overall score based on an analysis of the set of term scores, as described above. In other cases, the document management platform may use the data model to determine the overall score (e.g., in which case the data model may output the overall score, rather than the set of term scores).

In this way, the document management platform uses the data model to determine an overall score that corresponds to a likelihood of the contractual document being favorable to the user.

Figure 1D:
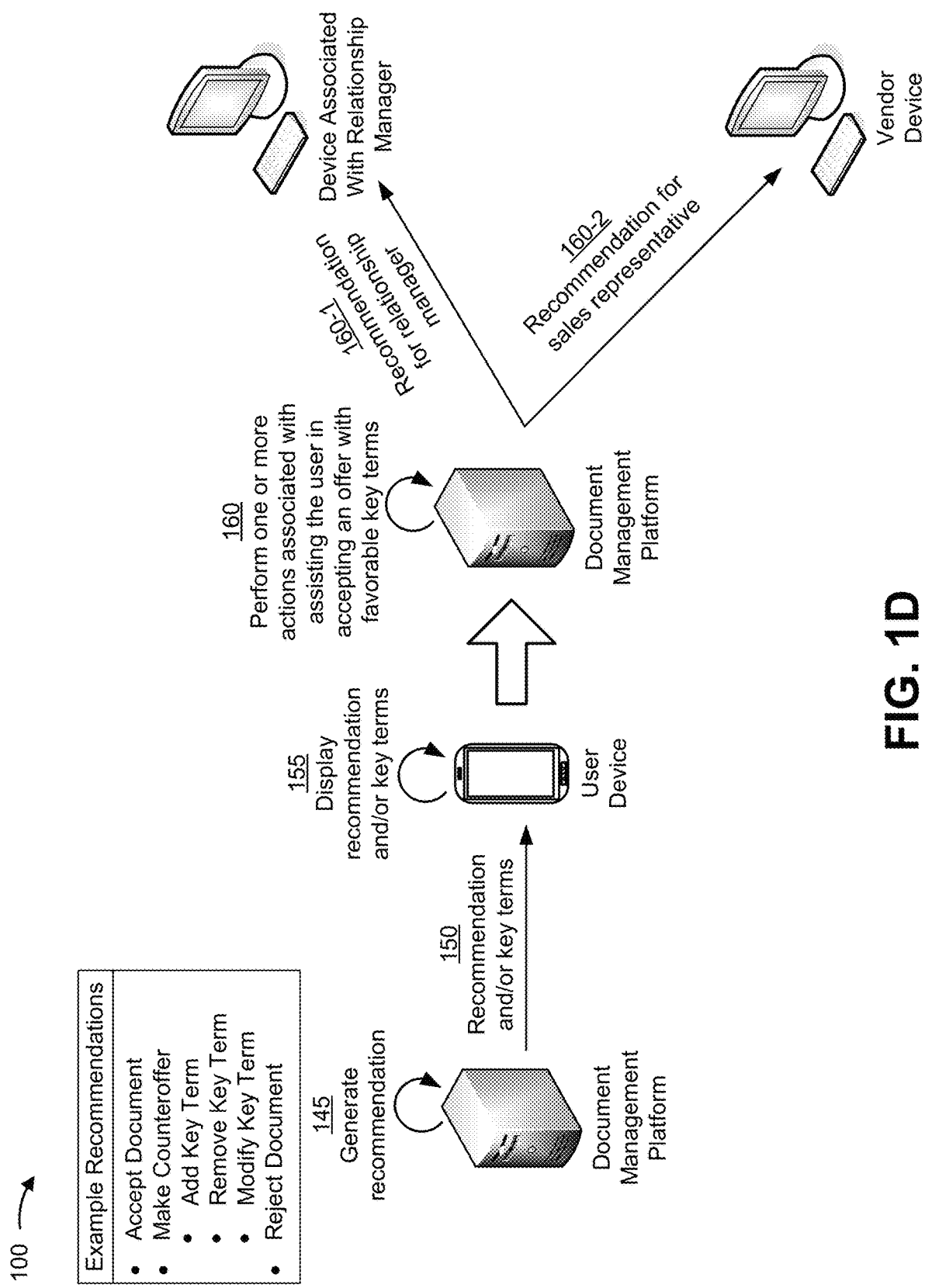

As shown in FIG. 1D, and by reference number 145, the document management platform may generate a recommendation for the user. For example, the document management platform may generate a recommendation that includes an indication of whether to accept the offer, one or more recommended modifications to one or more of the set of key terms, and/or the like. The indication of whether to accept the offer may be a message that is generated that indicates to accept the offer, to reject the offer, to make a counteroffer, to conditionally accept the offer, and/or the like. The one or more recommended modifications may include a modification to add a new key term to the contractual document, to remove a key term from the contractual document, to modify a key term that is included within the contractual document, and/or the like.

As an example, the document management platform may generate a recommendation to accept the offer. In this example, the document management platform may have generated an overall score that corresponds to a high likelihood of the offer being favorable to the user. The overall score may, for example, have been based on the contractual document including key terms that had values that satisfy a threshold level of similarity with similar key terms found in historical contractual documents that were found to be favorable to other users, based on the contractual document including key terms that had values within a range of permissible values identified in the user profile, based on the contractual document including key terms that had values that aligned with other similar offers (e.g., as indicated in the data identifying the offer information for the similar offers), and/or the like.

As another example, the document management platform may generate a recommendation to conditionally accept the offer, to make a counteroffer, and/or to reject the offer. In this example, the document management platform may have generated an overall score that corresponds to a low likelihood of the offer being favorable to the user. This may, for example, allow the document management platform to recommend to lower an asking price of a vehicle, recommend to purchase additional insurance with the vehicle (e.g., based on a mileage of the vehicle, etc.), recommend removal of one or more unfavorable terms (e.g., key terms found in a damages clause), recommend to modify a down payment, recommend to modify an APR of a loan for the vehicle and/or a term of years associated with the loan, and/or the like.

In some implementations, to determine whether the recommendation will be to conditionally accept the offer, make a counteroffer, and/or reject the offer, the document management platform may re-compute the set of term scores and/or the overall score using one or more simulated values that correspond to proposed modifications to key terms.

As an example, if the user is purchasing a vehicle, and all (or some) of the key terms are favorable to the user except for a down payment of $5,000, the document management platform may re-compute the set of term scores and/or the overall score using simulated values that correspond to proposed modifications to the down payment amount (e.g., $500, $1,000, $2,500, etc.). As another example, if the user receives a five year loan as part of an offer, and the document management platform has access to financial data and/or loan data of the user, the document management platform may run simulations (e.g., hundreds of simulations, thousands of simulations, or more) with various combinations of key terms and/or assumptions and may generate recommendations based on the simulations. In this particular example, based on the financial data, the document management platform might run simulations that assume that the user will be able to pay the loan off in 3.5 years (when the loan term of years is five years). This allows the document management platform to tailor recommendations specifically to each user.

In some cases, the document management platform may simply recommend key term values that are known to be favorable to the user (e.g., rather than expend processing resources using simulated values). In this way, the document management platform is able to identify optimal key terms for the user and to assist the user in recommending those key terms as modifications to the contractual document (e.g., which may be provided in the form of a conditional acceptance, a counteroffer, and/or the like).

As shown by reference number 150, the document management platform may provide the recommendation and/or the set of key terms to the user device. For example, the document management platform may provide the recommendation and/or the set of key terms via an interface, such as a web interface, an application programming interface (API), an interface of the application that supports the contract recommendation service, and/or the like.

As shown by reference number 155, the user device may display the recommendation and/or the key terms. For example, the user device may display the recommendation and/or the key terms via an interface of the application that supports the contract recommendation service. This may allow the user to view the recommendation and/or the set of key terms and/or to implement the recommendation. Additionally, in some cases, the set of key terms may be displayed in an easy to understand, aesthetically appealing manner, such that the user is able to view the set of key terms in one place (e.g., rather than having to sift back and forth through various pages of the contractual document).

As shown by reference number 160, the document management platform may perform one or more actions associated with assisting the user in accepting an offer with favorable key terms. For example, and as shown by reference number 160-1, the document management platform may generate and/or provide a recommendation to the device associated with the relationship manager of an organization that would be offering the user a loan as part of the agreement to purchase the product. The recommendation for the relationship manager may include a recommendation to modify a range of permissible of values of a particular key term (e.g., such as by requesting to have the relationship manager instruct a sales representative to decrease an APR rate being offered to the user), to call the sales representative that is working with the user to assist in discussing potentially modifying a particular key term, and/or the like.

As shown by reference number 160-2, the document management platform may generate and/or provide a recommendation for a sales representative to a vendor device (e.g., vendor device of a sales representative at a dealership that is offering the user a vehicle for sale). The recommendation for the sales representative may be a copy of the recommendation provided to the user device (e.g., to allow the sales representative to view the recommendation on the vendor device) and/or may be a new recommendation generated specifically for the sales representative. In some cases, the document management platform may provide, as part of the recommendation or the new recommendation, a list of links to websites that include similar offers that include key terms that are similar to the modified key terms that are part of the recommendation. In this way, the sales representative may be provided with evidence that particular key terms offered in a counteroffer or a conditional acceptance of the offer are being used in other offers for the same or similar product.

In some implementations, the document management may perform one or more other actions to assist the user in accepting the offer. For example, the user may provide the document management platform with a request to negotiate the contract. In this case, the document management platform may contact a sales representative using a chatbot to negotiate one or more terms on behalf of the user. As another example, the document management platform may assist with a checkout procedure after the user has accepted the product. In this example, if proof that the user has accepted the contractual document is uploaded to the application that supports the contract management service, the document management platform may interact with one or more devices associated with the financial institution of the user to automatically process a financial aspect of the transaction (e.g., such as by charging the user for a down payment).

In this way, the document management platform provides the user device with a recommendation that assists the user in determining whether to accept the offer and/or with ensuring that the offer accepted by the user is a favorable offer. This conserves resources (e.g., processing resources, network resources, memory resources, and/or the like) that would otherwise be used to accept a deal that is not favorable to the user, resources that would otherwise be used by the user to manually research particular key terms or aspects before accepting the offer, and/or the like.

As indicated above, FIGS. 1A-1D are provided merely as examples. Other examples may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) of example implementation(s) 100 may perform one or more functions described as being performed by another set of devices of example implementation(s) 100.

Figure 2:
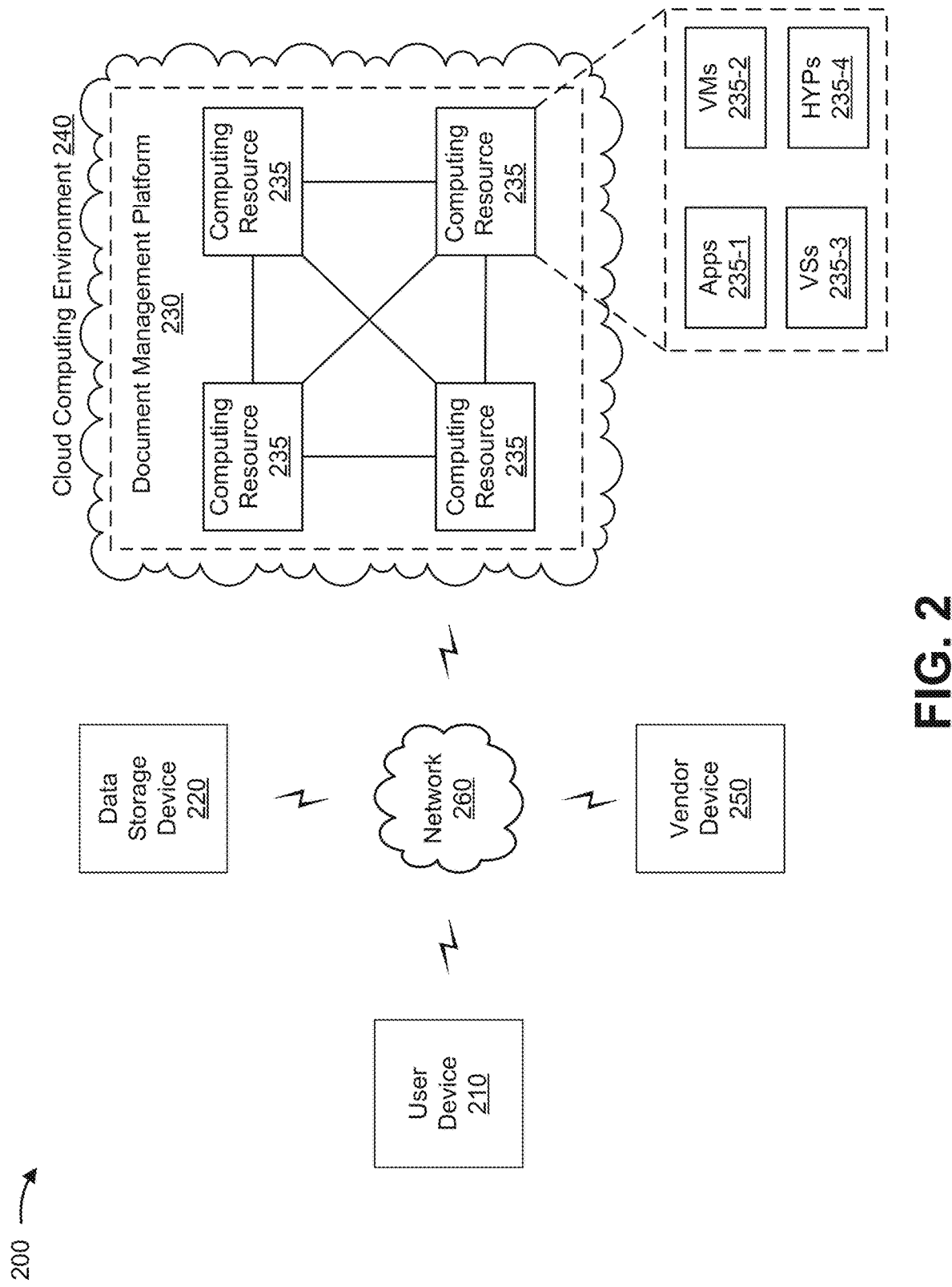
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data storage device 220, a document management platform 230 hosted within a cloud computing environment 240, a vendor device 250, and/or a network 260. Devices of environment 200 may interconnect via wired connections, wireless connections, or a combination of wired and wireless connections.

User device 210 includes one or more devices capable of receiving, generating, storing, processing, and/or providing information associated with a contractual document. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may support an application that allows a user to capture and upload one or more images of a contractual document that may be further processed by document management platform 230. In some implementations, user device 210 may receive, from document management platform 230, a recommendation associated with the contractual document and/or data identifying key terms within the contractual document.

In some implementations, one or more embodiments, techniques, functions, features, and/or the like, that are described herein as being performed by document management platform 230, may be performed by user device 210. For example, user device 210 may support the data model described as being supported by document management platform 230 (e.g., a light weight version of the data model, a complete version of the data model, etc.) and may generate the recommendation at user device 210. This conserves network resources by eliminating a need to send and/or receive data via network 260, improves security and safety of personal information of the user (e.g., by avoiding use of network 260, which may be susceptible to security breaches), and/or the like.

Data storage device 220 includes one or more devices capable of receiving, generating, storing, processing, and/or providing information associated with a contractual document, user data, vendor data, and/or the like. For example, data storage device 220 may include a server device or a group of server devices. In some implementations, one or more data storage devices 220 may store historical data used to train one or more data models, as is described elsewhere herein. In some implementations, data storage device 220 may provide the historical data to document management platform 230 for further processing.

Document management platform 230 includes one or more devices capable of receiving, storing, generating, determining, and/or providing information associated with a contractual document. For example, document management platform 230 may include a server device (e.g., a host server, a web server, an application server, etc.), a data center device, or a similar device. In some implementations, document management platform 230 may interact with vendor device 250 to provide a recommendation associated with the contractual document. Additionally, or alternatively, document management platform 230 may interact with another device, such as a device associated with a relationship manager of a loan provider or a similar type of device.

In some implementations, as shown, document management platform 230 may be hosted in cloud computing environment 240. Notably, while implementations described herein describe document management platform 230 as being hosted in cloud computing environment 240, in some implementations, document management platform 230 might not be cloud-based (i.e., may be implemented outside of a cloud computing environment) or may be partially cloud-based.

Cloud computing environment 240 includes an environment that hosts document management platform 230. Cloud computing environment 240 may provide computation, software, data access, storage, etc. services that do not require end-user knowledge of a physical location and configuration of system(s) and/or device(s) that hosts document management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host document management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, data storage device 220, vendor device 250, and/or another device described herein. Application 235-1 may eliminate a need to install and execute the software applications on these devices. For example, application 235-1 may include software associated with document management platform 230 and/or any other software capable of being provided via cloud computing environment 240. In some implementations, one application 235-1 may send/receive information to/from one or more other applications 235-1, via virtual machine 235-2.

In some implementations, application 235-1 may be an application that supports a contract management service. In some implementations, application 235-1 may be a web application, a mobile application, and/or a similar type of application. Application 235-1 may be hosted by user device 210, document management platform 230, and/or a combination of user device 210 and document management platform 230.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, vendor device 250, and/or another device described herein), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Vendor device 250 includes one or more devices capable of receiving, generating, storing, processing, and/or providing information associated with a contractual document. For example, vendor device 250 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
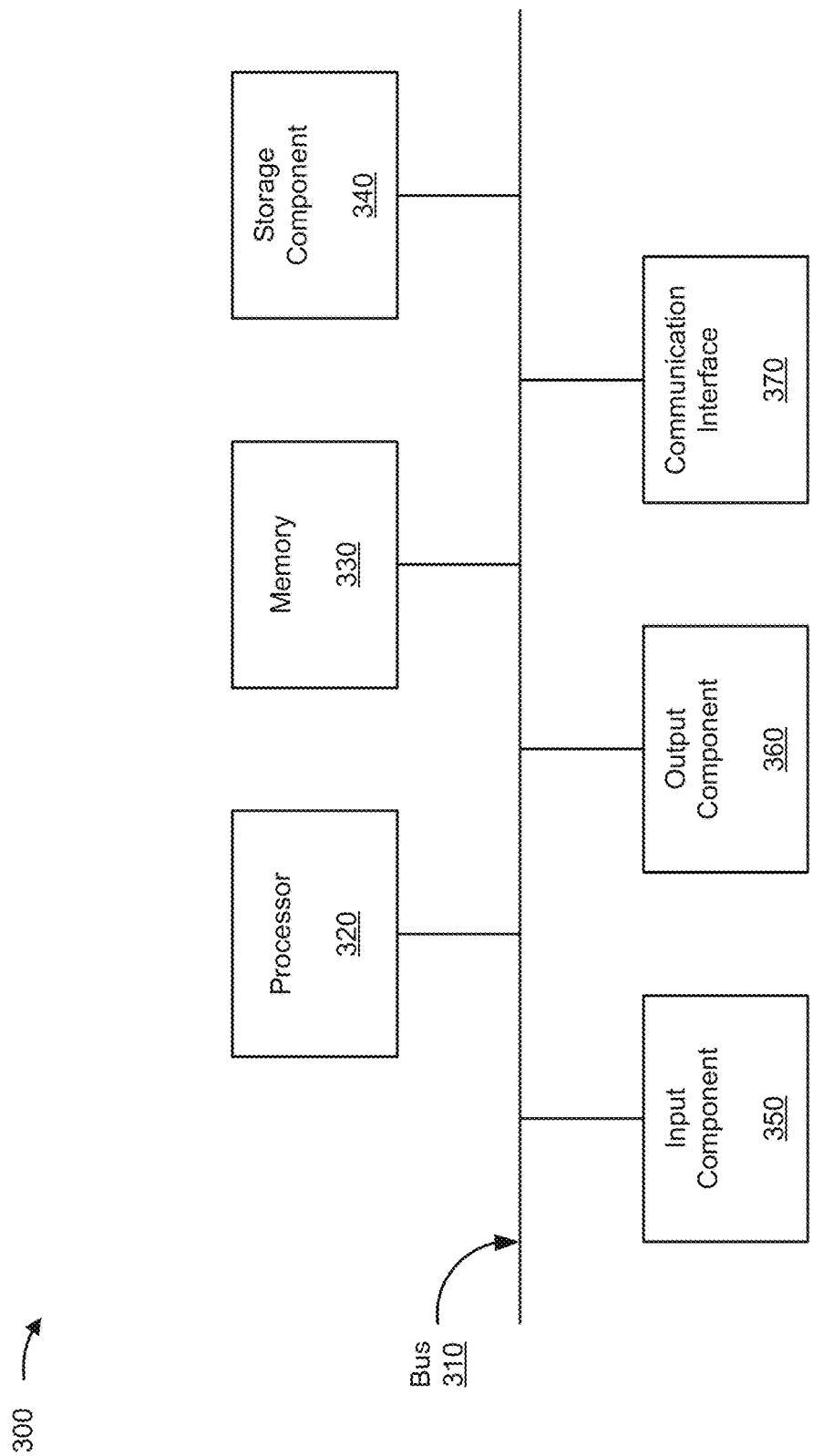
FIG. 3 is a diagram of example components of one or more devices of FIG. 2.

FIG. 3 is a diagram of example components of a device 300. Device 300 may correspond to user device 210, data storage device 220, document management platform 230, and/or vendor device 250. In some implementations, user device 210, data storage device 220, may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
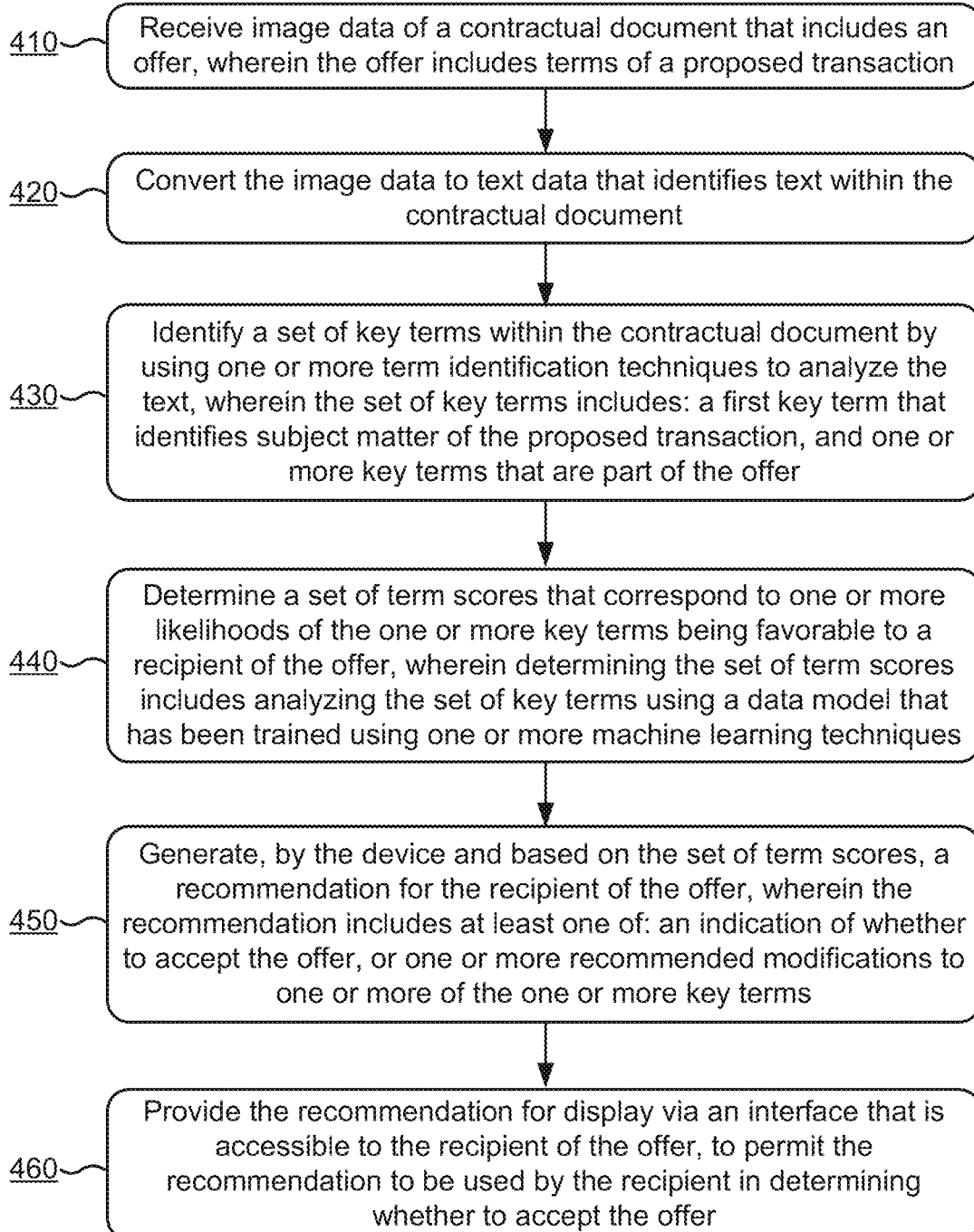
FIGS. 4-6 are flow charts of an example process for identifying and analyzing key terms that are part of an offer included in a contractual document and generating a recommendation to assist a user in determining whether to accept the offer.

FIG. 4 is a flow chart of an example process 400 for identifying and analyzing key terms that are part of an offer included in a contractual document and generating a recommendation to assist a user in determining whether to accept the offer. In some implementations, one or more process blocks of FIG. 4 may be performed by a document management platform (e.g., document management platform 230). In some implementations, one or more process blocks of FIG. 4 may be performed by another device or a group of devices separate from or including the document management platform, such as a user device (e.g., user device 210), a data storage device (e.g., data storage device 220), a vendor device (e.g., vendor device 250), and/or the like.

As shown in FIG. 4, process 400 may include receiving image data of a contractual document that includes an offer, wherein the offer includes terms of a proposed transaction (block 410). For example, the document management platform (e.g., using computing resource 235, processor 320, memory 330, storage component 340, input component 350, communication interface 370, and/or the like) may receive image data of a contractual document that includes an offer, as described above. In some implementations, the offer may include terms of a proposed transaction.

As further shown in FIG. 4, process 400 may include converting the image data to text data that identifies text within the contractual document (block 420). For example, the document management platform (e.g., using computing resource 235, processor 320, memory 330, storage component 340, input component 350, communication interface 370, and/or the like) may convert the image data to text data that identifies text within the contractual document, as described above.

As further shown in FIG. 4, process 400 may include identifying a set of key terms within the contractual document by using one or more term identification techniques to analyze the text, wherein the set of key terms includes a first key term that identifies subject matter of the proposed transaction, and one or more key terms that are part of the offer (block 430). For example, the document management platform (e.g., using computing resource 235, processor 320, memory 330, storage component 340, communication interface 370, and/or the like) may identify a set of key terms within the contractual document by using one or more term identification techniques to analyze the text, as described above. In some implementations, the set of key terms may include a first key term that identifies subject matter of the proposed transaction, and one or more key terms that are part of the offer.

As further shown in FIG. 4, process 400 may include determining a set of term scores that correspond to one or more likelihoods of the one or more key terms being favorable to a recipient of the offer, wherein determining the set of term scores includes analyzing the set of key terms using a data model that has been trained using one or more machine learning techniques (block 440). For example, the document management platform (e.g., using computing resource 235, processor 320, memory 330, storage component 340, and/or the like) may determine a set of term scores that correspond to one or more likelihoods of the one or more key terms being favorable to a recipient of the offer, as described above. In some implementations, determining the set of term scores may include analyzing the set of key terms using a data model that has been trained using one or more machine learning techniques.

As further shown in FIG. 4, process 400 may include generating, based on the set of term scores, a recommendation for the recipient of the offer, wherein the recommendation includes at least one of: an indication of whether to accept the offer, or one or more recommended modifications to one or more of the one or more key terms (block 450). For example, the document management platform (e.g., using computing resource 235, processor 320, memory 330, storage component 340, and/or the like) may generate, based on the set of term scores, a recommendation for the recipient of the offer, as described above. In some implementations, the recommendation may include an indication of whether to accept the offer, and/or one or more recommended modifications to one or more of the one or more key terms.

As further shown in FIG. 4, process 400 may include providing the recommendation for display via an interface that is accessible to the recipient of the offer, to permit the recommendation to be used by the recipient in determining whether to accept the offer (block 460). For example, the document management platform (e.g., using computing resource 235, processor 320, memory 330, storage component 340, input component 350, output component 360, communication interface 370, and/or the like) may provide the recommendation for display via an interface that is accessible to the recipient of the offer, to permit the recommendation to be used by the recipient in determining whether to accept the offer, as described above.

Process 400 may include additional implementations, such as any single implementation or any combination of implementations described below and/or in connection with one or more other processes described elsewhere herein.

In some implementations, when receiving the image data, the document management platform may receive the image data from another device, where the image data was obtained by a sensor of the other device, and, when providing the recommendation, the document management platform may provide the recommendation for display via the other device to cause the other device to be used by the recipient to accept the offer, conditionally accept the offer, make a counteroffer, and/or reject the offer.

In some implementations, the one or more key terms may include a second key term that identifies the recipient of the offer, a third key term that identifies a maker of the offer, a fourth key term that identifies the subject matter of the proposed transaction, a first subset of the one or more key terms that identify information describing the subject matter of the proposed transaction, and/or a second subset of the one or more key terms that identify purchasing information for the subject matter of the proposed transaction.

In some implementations, when determining the set of term scores, the document management platform may provide the set of key terms as input to the data model to cause the data model to output the set of term scores, where the set of key terms includes one or more key terms that identify purchasing information for the subject matter of the proposed transaction, and where one or more term scores, of the set of term scores, are based on whether the one or more key terms that identify the purchasing information have values that are within one or more threshold ranges of values associated with corresponding terms that are found in offers for particular subject matter that is similar to the subject matter of the proposed transaction.

In some implementations, when determining the set of term scores, the document management platform may provide the set of key terms and preferences information for the recipient of the offer as input to the data model to cause the data model to output the set of term scores. The set of term scores may be based on a first indication of whether the set of key terms includes one or more key terms with values that are within a first one of one or more threshold ranges of values associated with corresponding terms that are found in offers for particular subject matter that is similar to the subject matter of the proposed transaction, and/or a second indication of whether the values are within a second one of one or more threshold ranges of values associated with other corresponding terms that are found in the preferences information.

In some implementations, the document management platform may determine an overall score that corresponds to an overall likelihood of the one or more key terms being favorable to the recipient of the offer based on data indicating whether the set of term scores satisfies a corresponding set of threshold favorability scores, data indicating an average of the set of term scores, and/or data indicating a weighted average of the set of term scores. In some implementations, when generating the recommendation, the document management platform may generate the recommendation based on the overall score.

In some implementations, when generating the recommendation, the document management platform may generate the recommendation to include the one or more recommended modifications to the one or more key terms. The one or more recommended modifications may include a first modification to add a new key term to the contractual document, a second modification to remove a key term, of the one or more key terms, from the contractual document, and/or a third modification to change a particular key term of the one or more key terms. The one or more recommended modifications may be based on one or more corresponding terms that are found in offers for particular subject matter that is similar to the subject matter of the proposed transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
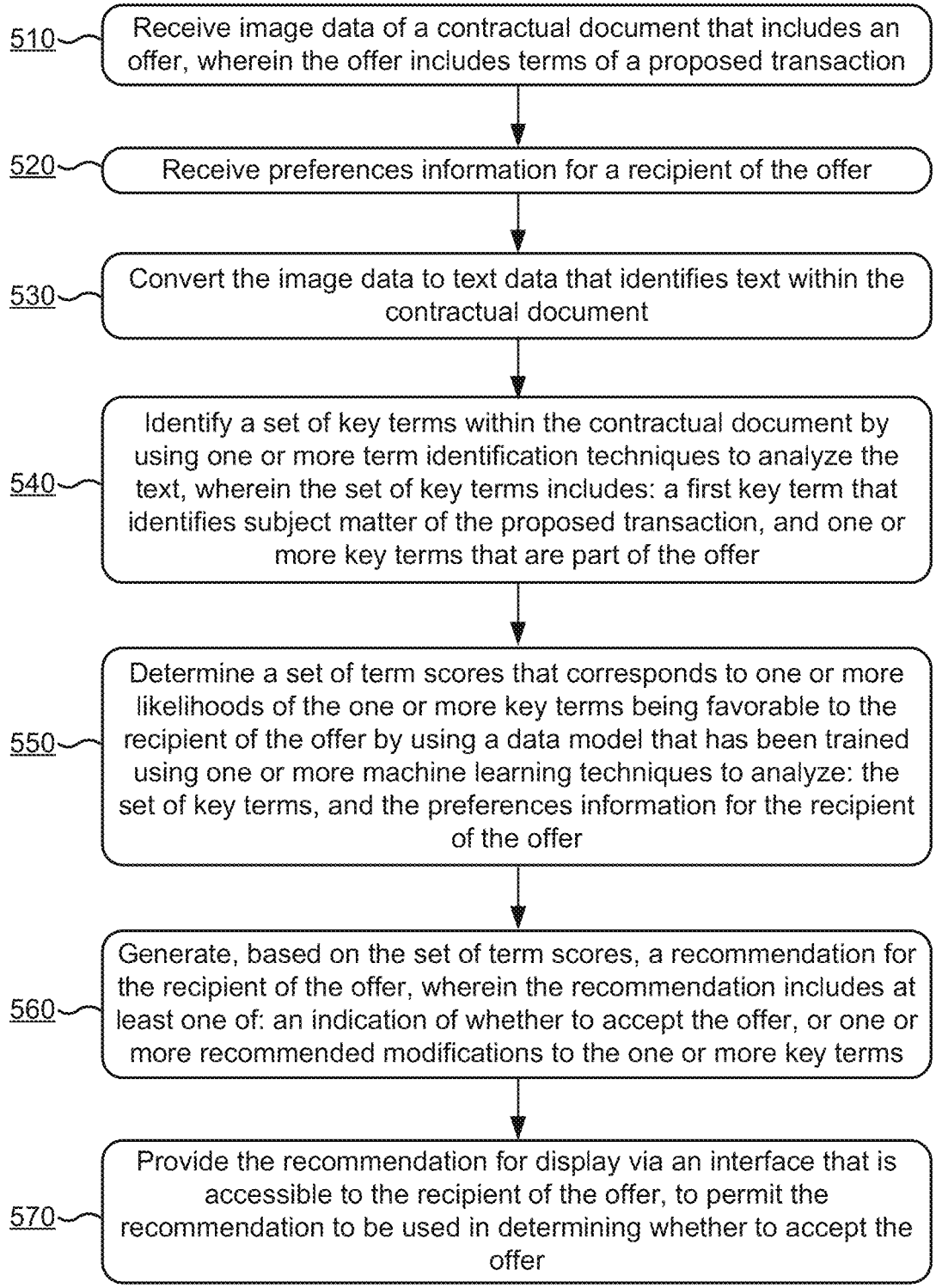

FIG. 5 is a flow chart of an example process 500 for identifying and analyzing key terms that are part of an offer included in a contractual document and generating a recommendation to assist a user in determining whether to accept the offer. In some implementations, one or more process blocks of FIG. 5 may be performed by a document management platform (e.g., document management platform 230). In some implementations, one or more process blocks of FIG. 5 may be performed by another device or a group of devices separate from or including the document management platform, such as a user device (e.g., user device 210), a data storage device (e.g., data storage device 220), a vendor device (e.g., vendor device 250), and/or the like.

As shown in FIG. 5, process 500 may include receiving image data of a contractual document that includes an offer, wherein the offer includes terms of a proposed transaction (block 510). For example, the document management platform (e.g., using computing resource 235, processor 320, memory 330, storage component 340, input component 350, communication interface 370, and/or the like) may receive image data of a contractual document that includes an offer, as described above. In some implementations, the offer may include terms of a proposed transaction.

As further shown in FIG. 5, process 500 may include receiving preferences information for a recipient of the offer (block 520). For example, the document management platform (e.g., using computing resource 235, processor 320, memory 330, storage component 340, input component 350, communication interface 370, and/or the like) may receive preferences information for a recipient of the offer, as described above.

As further shown in FIG. 5, process 500 may include converting the image data to text data that identifies text within the contractual document (block 530). For example, the document management platform (e.g., using computing resource 235, processor 320, memory 330, storage component 340, communication interface 370, and/or the like) may convert the image data to text data that identifies text within the contractual document, as described above.

As further shown in FIG. 5, process 500 may include identifying a set of key terms within the contractual document by using one or more term identification techniques to analyze the text, wherein the set of key terms includes a first key term that identifies subject matter of the proposed transaction, and one or more key terms that are part of the offer (block 540). For example, the document management platform (e.g., using computing resource 235, processor 320, memory 330, storage component 340, and/or the like) may identify a set of key terms within the contractual document by using one or more term identification techniques to analyze the text, as described above. In some implementations, the set of key terms may include a first key term that identifies subject matter of the proposed transaction, and one or more key terms that are part of the offer.

As further shown in FIG. 5, process 500 may include determining a set of term scores that corresponds to one or more likelihoods of the one or more key terms being favorable to the recipient of the offer by using a data model that has been trained using one or more machine learning techniques to analyze the set of key terms and the preferences information for the recipient of the offer (block 550). For example, the document management platform (e.g., using computing resource 235, processor 320, memory 330, storage component 340, and/or the like) may determine a set of term scores that corresponds to one or more likelihoods of the one or more key terms being favorable to the recipient of the offer by using a data model that has been trained using one or more machine learning techniques to analyze the set of key terms and the preferences information for the recipient of the offer, as described above.

As further shown in FIG. 5, process 500 may include generating, based on the set of term scores, a recommendation for the recipient of the offer, wherein the recommendation includes at least one of: an indication of whether to accept the offer, or one or more recommended modifications to the one or more key terms (block 560). For example, the document management platform (e.g., using computing resource 235, processor 320, memory 330, storage component 340, and/or the like) may generate, based on the set of term scores, a recommendation for the recipient of the offer, as described above. In some implementations, the recommendation may include an indication of whether to accept the offer, and/or one or more recommended modifications to the one or more key terms.

As further shown in FIG. 5, process 500 may include providing the recommendation for display via an interface that is accessible to the recipient of the offer, to permit the recommendation to be used in determining whether to accept the offer (block 570). For example, the document management platform (e.g., using computing resource 235, processor 320, memory 330, storage component 340, input component 350, output component 360, communication interface 370, and/or the like) may provide the recommendation for display via an interface that is accessible to the recipient of the offer, to permit the recommendation to be used in determining whether to accept the offer, as described above.

Process 500 may include additional implementations, such as any single implementation or any combination of implementations described below and/or in connection with one or more other processes described elsewhere herein.

In some implementations, the document management platform may include a sensor, and the sensor may be configured to capture the image data that identifies the contractual document, and to provide the image data to the one or more processors. In some implementations, the one or more key terms may include a second key term that identifies the recipient of the offer, a third key term that identifies a maker of the offer, a fourth key term that identifies the subject matter of the proposed transaction, a first subset of the one or more key terms that identify information describing the subject matter of the proposed transaction, and/or a second subset of the one or more key terms that identify purchasing information for the subject matter of the proposed transaction.

In some implementations, when determining the set of term scores, the document management platform may provide the set of key terms and the preferences information for the recipient of the offer as input to the data model to cause the data model to output the set of term scores. The set of term scores may be based on a first indication of whether the set of key terms includes one or more key terms with values that are within a first one of one or more threshold ranges of values associated with corresponding terms that are found in offers for particular subject matter that is similar to the subject matter of the proposed transaction, and a second indication of whether the values are within a second one of one or more threshold ranges of values associated with other corresponding terms that are found in the preferences information.

In some implementations, the document management platform may obtain offer information for a set of offers for particular subject matter that is similar to the subject matter of the proposed transaction by using the set of key terms to search one or more data sources. Additionally, when determining the set of term scores, the document management platform may provide the set of key terms, the preferences information for the recipient of the offer, and the offer information as input to the data model to cause the data model to output the set of term scores. The set of term scores may be based on a first indication of whether the set of key terms include one or more key terms with values that are within a first one of one or more threshold ranges of values associated with corresponding terms that are found in historical offers for particular subject matter that is similar to the subject matter of the proposed transaction, a second indication of whether the values are within a second one of one or more threshold ranges of values associated with other corresponding terms that are found in the preferences information, and a third indication of whether the values are within a third one of one or more threshold ranges of values associated with additional corresponding terms that are found in the offer information for the set of offers for the particular subject matter.

In some implementations, the document management platform may determine an overall score by analyzing the set of term scores. The overall score may be based on data indicating whether the set of term scores satisfies a set of threshold favorability scores, data indicating an average of the set of term scores, and/or data indicating a weighted average of the set of term scores, and, when generating the recommendation, the document management platform may generate the recommendation based on the overall score.

In some implementations, when generating the recommendation, the document management platform may determine to modify a particular key term of the one or more key terms, where determining to modify the particular key term is based on a particular term score, that corresponds to the particular key term, satisfying a threshold likelihood of being unfavorable to the recipient of the offer. In some implementations, when generating the recommendation, the document management platform may identify a new term to recommend to replace the particular key term by analyzing offers for particular subject matter that is similar to the subject matter of the proposed transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
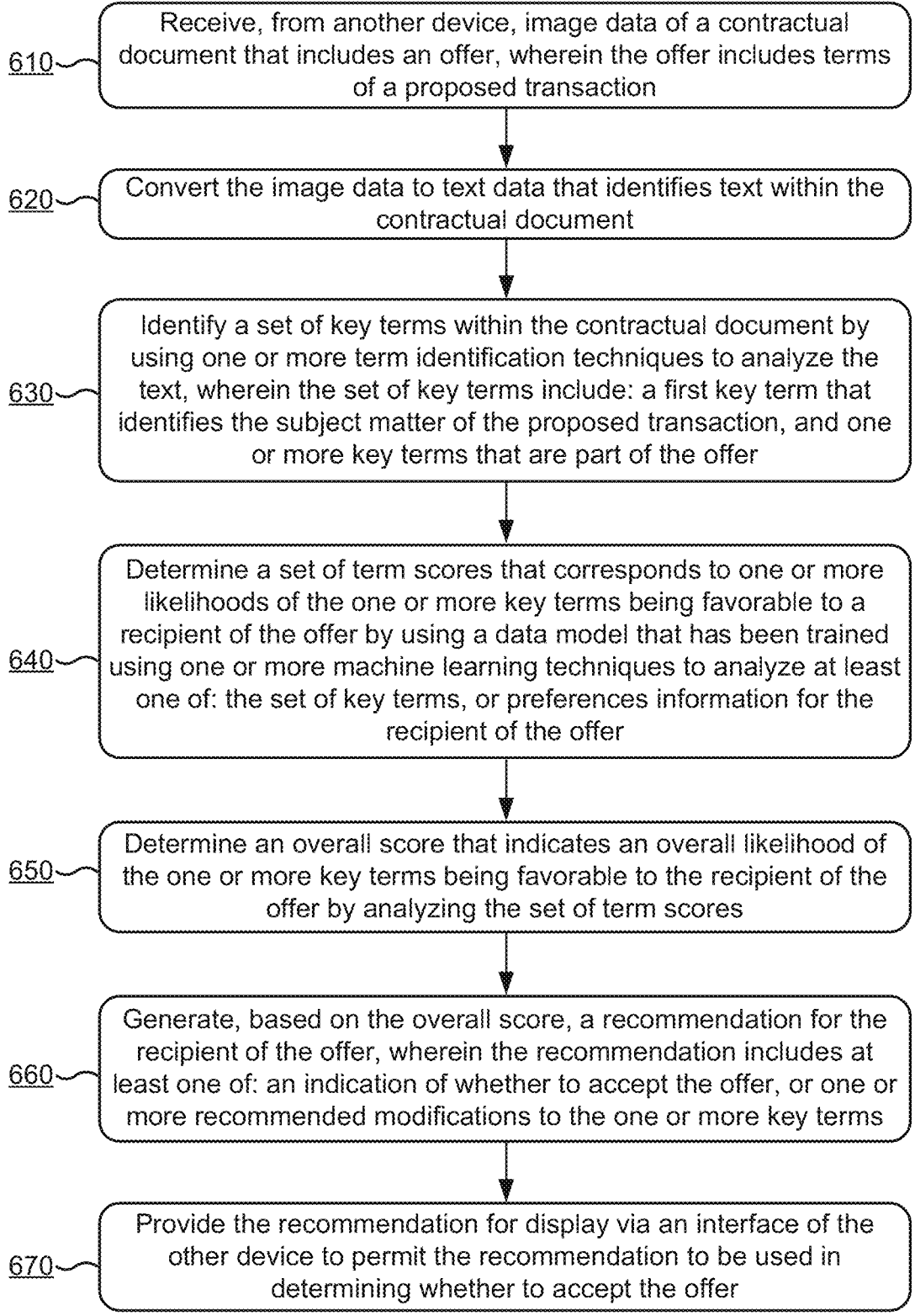

FIG. 6 is a flow chart of an example process 600 for identifying and analyzing key terms that are part of an offer included in a contractual document and generating a recommendation to assist a user in determining whether to accept the offer. In some implementations, one or more process blocks of FIG. 6 may be performed by a document management platform (e.g., document management platform 230). In some implementations, one or more process blocks of FIG. 6 may be performed by another device or a group of devices separate from or including the document management platform, such as a user device (e.g., user device 210), a data storage device (e.g., data storage device 220), a vendor device (e.g., vendor device 250), and/or the like.

As shown in FIG. 6, process 600 may include receiving, from another device, image data of a contractual document that includes an offer, wherein the offer includes terms of a proposed transaction (block 610). For example, the document management platform (e.g., using computing resource 235, processor 320, memory 330, storage component 340, input component 350, communication interface 370, and/or the like) may receive, from another device (e.g., user device 210), image data of a contractual document that includes an offer, as described above. In some implementations, the offer may include terms of a proposed transaction.

As further shown in FIG. 6, process 600 may include converting the image data to text data that identifies text within the contractual document (block 620). For example, the document management platform (e.g., using computing resource 235, processor 320, memory 330, storage component 340, communication interface 370, and/or the like) may convert the image data to text data that identifies text within the contractual document, as described above.

As further shown in FIG. 6, process 600 may include identifying a set of key terms within the contractual document by using one or more term identification techniques to analyze the text, wherein the set of key terms include a first key term that identifies the subject matter of the proposed transaction, and one or more key terms that are part of the offer (block 630). For example, the document management platform (e.g., using computing resource 235, processor 320, memory 330, storage component 340, and/or the like) may identify a set of key terms within the contractual document by using one or more term identification techniques to analyze the text, as described above. In some implementations, the set of key terms may include a first key term that identifies the subject matter of the proposed transaction, and one or more key terms that are part of the offer.

As further shown in FIG. 6, process 600 may include determining a set of term scores that corresponds to one or more likelihoods of the one or more key terms being favorable to a recipient of the offer by using a data model that has been trained using one or more machine learning techniques to analyze at least one of: the set of key terms, or preferences information for the recipient of the offer (block 640). For example, the document management platform (e.g., using computing resource 235, processor 320, memory 330, storage component 340, and/or the like) may determine a set of term scores that corresponds to one or more likelihoods of the one or more key terms being favorable to a recipient of the offer by using a data model that has been trained using one or more machine learning techniques to analyze the set of key terms and/or preferences information for the recipient of the offer, as described above.

As further shown in FIG. 6, process 600 may include determining an overall score that indicates an overall likelihood of the one or more key terms being favorable to the recipient of the offer by analyzing the set of term scores (block 650). For example, the document management platform (e.g., using computing resource 235, processor 320, memory 330, storage component 340, input component 350, communication interface 370, and/or the like) may determine an overall score that indicates an overall likelihood of the one or more key terms being favorable to the recipient of the offer by analyzing the set of term scores, as described above.

As further shown in FIG. 6, process 600 may include generating, based on the overall score, a recommendation for the recipient of the offer, wherein the recommendation includes at least one of: an indication of whether to accept the offer, or one or more recommended modifications to the one or more key terms (block 660). For example, the document management platform (e.g., using computing resource 235, processor 320, memory 330, storage component 340, and/or the like) may generate, based on the overall score, a recommendation for the recipient of the offer, as described above. In some implementations, the recommendation may include an indication of whether to accept the offer and/or one or more recommended modifications to the one or more key terms.

As further shown in FIG. 6, process 600 may include providing the recommendation for display via an interface of the other device to permit the recommendation to be used in determining whether to accept the offer (block 670). For example, the document management platform (e.g., using computing resource 235, processor 320, memory 330, storage component 340, input component 350, output component 360, communication interface 370, and/or the like) may provide the recommendation for display via an interface of the other device to permit the recommendation to be used in determining whether to accept the offer, as described above.

Process 600 may include additional implementations, such as any single implementation or any combination of implementations described below and/or in connection with one or more other processes described elsewhere herein.

In some implementations, when identifying the set of key terms, the document management platform may identify a set of terms included in the text by analyzing the text using a tokenization technique, may compare the set of terms and a configured set of tokens, and may identify a subset of the set of terms, as the set of key terms, based on the set of key terms satisfying a threshold level of similarity with the configured set of tokens.

In some implementations, the one or more key terms may include a second key term that identifies the recipient of the offer, a third key term that identifies a maker of the offer, a fourth key term that identifies the subject matter of the proposed transaction, a first subset of the one or more key terms that identify information describing the subject matter of the proposed transaction, and/or a second subset of the one or more key terms that identify purchasing information for the subject matter of the proposed transaction.

In some implementations, when generating the recommendation, the document management platform may determine that a particular term score, that corresponds to a particular key term, satisfies a threshold likelihood of being unfavorable to the recipient of the offer. In some implementations, when generating the recommendation, the document management platform may determine to recommend modifying the particular key term based on the particular term score satisfying the threshold likelihood of being unfavorable to the recipient of the offer, and may identify a new term to recommend to replace the particular key term by analyzing offers for particular subject matter that is similar to the subject matter of the proposed transaction.

In some implementations, when determining the set of term scores, the document management platform may provide the set of key terms and the preferences information for the recipient of the offer as input to the data model to cause the data model to output the set of term scores, where the set of term scores are based on a first indication of whether the set of key terms include one or more key terms with values that are within a first one of one or more threshold ranges of values associated with corresponding terms that are found in offers for particular subject matter that is similar to the subject matter of the proposed transaction, and a second indication of whether the values are within a second one of one or more threshold ranges of values associated with other corresponding terms that are found in the preferences information.

In some implementations, the overall score may be determined based on data identifying whether the set of term scores satisfies a set of threshold favorability scores, data identifying an average of the set of term scores, and/or data identifying a weighted average of the set of term scores.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

To the extent certain embodiments, features, functions, and/or the like, relate to personal information of users, it is to be understood that such information is used in accordance with all applicable laws. For example, in some cases, a user may have to provide consent for certain types of information to be made available to the document management platform. As another example, the document management platform may use one or more anonymization techniques to anonymize certain types of information, so as to protect personal or privileged information of users.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, contract data of a contractual document that includes an offer;
   receiving, by the device, user data for a consumer associated with the offer;
   identifying, by the device, a set of key terms within the contractual document by analyzing the contract data,
      wherein the set of key terms includes one or more key terms that are part of the offer;
   determining, by the device, a set of term scores that correspond to one or more likelihoods of the one or more key terms being favorable to the consumer as compared to being unfavorable to the consumer;
   determining, by the device, one or more unfavorable key terms, from the set of key terms, having unfavorable term scores, from the set of term scores, that are less than a threshold,
      wherein the threshold is based on the user data for the consumer;
   running, by the device, one or more simulations with one or more proposed modifications of the one or more unfavorable key terms, by modifying a parameter of the one or more unfavorable key terms;
   determining, by the device, a revised set of term scores based on running the one or more simulations to determine a recommendation,
      wherein the recommendation includes one or more of the one or more proposed modifications to one or more of the one or more unfavorable key terms based on the revised set of term scores; and
   providing, by the device, the recommendation to the consumer to be used in determining whether to accept the offer.

2. The method of claim 1, wherein providing the recommendation comprises:
   providing the recommendation for display via another device to facilitate:
      accepting the offer,
      conditionally accepting the offer,
      making a counteroffer, or
      rejecting the offer.

3. The method of claim 1, further comprising:
   performing one or more actions associated with assisting the consumer in accepting the offer by providing the recommendation for one or more of:
      a relationship manager, or
      a sales representative.

4. The method of claim 1, wherein determining the set of term scores comprises:

providing the set of key terms as input to a data model to cause the data model to output the set of term scores,
wherein the set of key terms includes one or more key terms that identify purchasing information associated with the offer, and
wherein one or more term scores, of the set of term scores, are based on whether the one or more key terms that identify the purchasing information have values that are within one or more threshold ranges of values associated with corresponding terms that are found in offers similar to the offer.

5. The method of claim 1, further comprising:
determining an overall score that corresponds to an overall likelihood of the one or more key terms being favorable to the consumer based on data indicating a weighted average of the set of term scores; and
wherein generating the recommendation comprises:
generating the recommendation based on the overall score.

6. The method of claim 1, wherein receiving the contract data comprises: receiving image data from another device,
wherein the image data was obtained by a sensor of the other device.

7. The method of claim 1, wherein generating the recommendation comprises:
generating the recommendation to include the one or more proposed modifications to the one or more key terms,
wherein the one or more proposed modifications include at least one of:
a first modification to add a new key term to the contractual document,
a second modification to remove a key term, of the one or more key terms, from the contractual document, or
a third modification to change a particular key term of the one or more key terms in the contractual document.

8. A device, comprising:
one or more memories; and
one or more processors, operatively coupled to the one or more memories, configured to:
receive contract data of a contractual document that includes an offer;
receive user data for a consumer associated with the offer;
identify a set of key terms within the contractual document by analyzing the contract data,
wherein the set of key terms includes one or more key terms that are part of the offer;
determine one or more unfavorable key terms, from the set of key terms, having unfavorable term scores, from a set of term scores, that are less than a threshold,
wherein the threshold is based on the user data for the consumer, and
wherein the set of term scores correspond to one or more likelihoods of the one or more key terms being favorable to the consumer as compared to being unfavorable to the consumer;
run one or more simulations with one or more proposed modifications of the one or more unfavorable key terms, by modifying a parameter of the one or more unfavorable key terms to make the consumer more likely to accept the offer than if the parameter of the one or more unfavorable key terms were not modified;
determine a revised set of term scores based on running the one or more simulations to determine a recommendation,
wherein the recommendation includes one or more of the one or more proposed modifications to one or more of the one or more unfavorable key terms based on the revised set of term scores; and
provide the recommendation to the consumer to be used in determining whether to accept the offer.

9. The device of claim 8, wherein the one or more processors, when providing the recommendation, are configured to:
provide the recommendation for display via another device to facilitate:
making a counteroffer, or
rejecting the offer.

10. The device of claim 8, wherein the one or more processors when identifying the set of key terms, are configured to:
identify the key terms within the contractual document using a term matching technique to compare text included within the contractual document and a master set of key terms.

11. The device of claim 8, wherein the one or more processors are further configured to:
provide the set of key terms as input to a data model to cause the data model to output the set of term scores,
wherein the set of key terms includes one or more key terms that identify a down payment amount associated with the offer, and
wherein one or more term scores, of the set of term scores, are based on whether the one or more key terms that identify the down payment amount has a value that is within one or more threshold ranges of values associated with corresponding terms that are found in offers similar to the offer.

12. The device of claim 8, wherein the one or more processors are further configured to:
determine an overall score that corresponds to an overall likelihood of the one or more key terms being favorable to the consumer based on data indicating a weighted average of the set of term scores; and
wherein the one or more processors, when generating the recommendation, are to:
generate the recommendation based on the overall score.

13. The device of claim 8, wherein the one or more processors, when receiving the contract data, are configured to:
upload the contractual document,
wherein the contractual document is an electronic document.

14. The device of claim 8, wherein the one or more processors, when generating the recommendation, are configured to:
generate the recommendation to include the one or more proposed modifications to the one or more key terms,
wherein the one or more proposed modifications include at least one of:
a first modification to add a new key term to the contractual document,
a second modification to remove a key term, of the one or more key terms, from the contractual document, or
a third modification to change a particular key term of the one or more key terms in the contractual document.

15. A non-transitory computer-readable medium storing instructions, the instructions comprising:
one or more instructions that, when executed by one or more processors of a device, cause the one or more processors to:
identify a set of key terms within a contractual document by analyzing contractual data in the contractual document,
wherein the contractual document includes an offer, and
wherein the set of key terms includes one or more key terms that are part of the offer;
determine a set of term scores that correspond to one or more likelihoods of the one or more key terms being favorable to a consumer as compared to being unfavorable to the consumer;
determine one or more unfavorable key terms, from the set of key terms, having unfavorable term scores, from the set of term scores, that are less than a threshold,
wherein the threshold is based on user data for the consumer;
run one or more simulations with one or more proposed modifications of the one or more unfavorable key terms, by modifying a parameter of the one or more unfavorable key terms;
determine a revised set of term scores based on running the one or more simulations to determine a recommendation,
wherein the recommendation includes one or more of the one or more proposed modifications to one or more of the one or more unfavorable key terms based on the revised set of term scores; and
provide the recommendation to the consumer to be used in determining whether to accept the offer.

16. The non-transitory computer-readable medium of claim 15, wherein the one or more instructions, that cause the one or more processors to provide the recommendation, cause the one or more processors to:
provide the recommendation for display via another device to facilitate making a counteroffer to recommend removal of the one or more unfavorable key terms.

17. The non-transitory computer-readable medium of claim 15, wherein the one or more instructions, that cause the one or more processors to identify the set of key terms, cause the one or more processors to:
identify the key terms within the contractual document using one or more of:
a fuzzy matching technique,
a tokenization technique,
a lexical analysis technique, or
an occurrence counting technique.

18. The non-transitory computer-readable medium of claim 15, wherein the one or more instructions, further cause the one or more processors to:
provide the set of key terms as input to a data model to cause the data model to output the set of term scores,
wherein the set of key terms includes one or more key terms that identify purchase information associated with the offer, and
wherein one or more term scores, of the set of term scores, are based on whether the one or more key terms that identify the purchasing information have values that are within one or more threshold ranges of values associated with corresponding terms that are found in offers similar to the offer.

19. The non-transitory computer-readable medium of claim 15, wherein the one or more instructions, further cause the one or more processors to:
determine an overall score that corresponds to an overall likelihood of the one or more key terms being favorable to the consumer based on data indicating a weighted average of the set of term scores; and
wherein the one or more processors, when generating the recommendation, are to:
generate the recommendation based on the overall score.

20. The non-transitory computer-readable medium of claim 15, wherein the one or more instructions, further cause the one or more processors to:
receive a sales contract for a product,
wherein the sales contract is the contractual document.

* * * * *